United States Patent [19] [11] Patent Number: 4,491,753
Kumatani [45] Date of Patent: Jan. 1, 1985

[54] LOW INERTIAL VARIABLE SPEED INDUCTION MOTOR

[75] Inventor: Hiroshi Kumatani, Nagoya, Japan

[73] Assignee: Mitsubishi Denki Kabushiki Kaisha, Tokyo, Japan

[21] Appl. No.: 350,355

[22] Filed: Feb. 19, 1982

[30] Foreign Application Priority Data

Mar. 19, 1981 [JP] Japan ............................ 56-40116
Mar. 24, 1981 [JP] Japan ............................ 56-42728
Mar. 25, 1981 [JP] Japan ............................ 56-43679
Mar. 25, 1981 [JP] Japan ............................ 56-43680

[51] Int. Cl.$^3$ ............................................. H02K 7/12
[52] U.S. Cl. ................................... 310/77; 188/164; 310/93; 310/266
[58] Field of Search ............... 310/166, 178, 266, 77, 310/93, 76, 78, 63, 103, 105, 92, 64; 192/18 R; 188/164, 5

[56] References Cited

U.S. PATENT DOCUMENTS

| 2,827,855 | 3/1958 | Rankin | 310/63 |
| 3,090,571 | 5/1963 | Lohest et al. | 310/266 |
| 3,221,854 | 12/1965 | Jaeschke et al. | 188/164 |
| 3,251,444 | 5/1966 | Erban | 188/164 |
| 3,316,429 | 4/1967 | Jaeschke | 310/93 |
| 3,474,273 | 10/1969 | Duurkoop | 310/77 |
| 3,493,796 | 2/1970 | Siegel | 310/76 |
| 3,564,311 | 2/1971 | Beyersdorf | 310/93 |
| 3,600,616 | 8/1971 | Yokoyama | 310/76 |
| 3,736,449 | 5/1973 | Honeywell et al. | 310/171 |
| 3,899,061 | 8/1975 | Krug | 188/164 |
| 4,337,406 | 6/1982 | Binder | 310/91 |

FOREIGN PATENT DOCUMENTS

| 131065 | 5/1902 | Fed. Rep. of Germany . |
| 712845 | 10/1941 | Fed. Rep. of Germany . |
| 892303 | 3/1954 | Fed. Rep. of Germany . |
| 1081966 | 4/1960 | Fed. Rep. of Germany . |
| 1172357 | 6/1964 | Fed. Rep. of Germany . |
| 1172768 | 6/1964 | Fed. Rep. of Germany . |
| 1921098 | 12/1970 | Fed. Rep. of Germany . |
| 2233386 | 1/1974 | Fed. Rep. of Germany . |
| 2461397 | 1/1981 | France . |
| 208053 | 4/1940 | Switzerland . |

OTHER PUBLICATIONS

W. G.: Der Elektromeister, 1963, H. 14, S. 958.

Primary Examiner—J. D. Miller
Assistant Examiner—D. Rebsch
Attorney, Agent, or Firm—Oblon, Fisher, Spivak, McClelland & Maier

[57] ABSTRACT

A motor has an electromagnetic brake which is connected to the output shaft to brake the rotation of the output shaft, whereby the driving body can be forcibly braked with excellent stopping response.

A fan for forcibly cooling the inside of the motor is enclosed in the casing, whereby temperature rises can be prevented by ventilation.

A bracket for supporting the iron core of the brake coil is made of a non-magnetic material, whereby the leaked magnetic flux passing through the bearing fixed on the bracket can be prevented, and consequent damage to the bearing heated by the eddy current can be prevented.

The stator can be a stator having windings used in a conventional induction motor, and the rotor is a cup type rotor having a simple structure extended in the axial direction. Accordingly, the structure is simple, and the size of the motor in the radial direction can be reduced.

3 Claims, 7 Drawing Figures

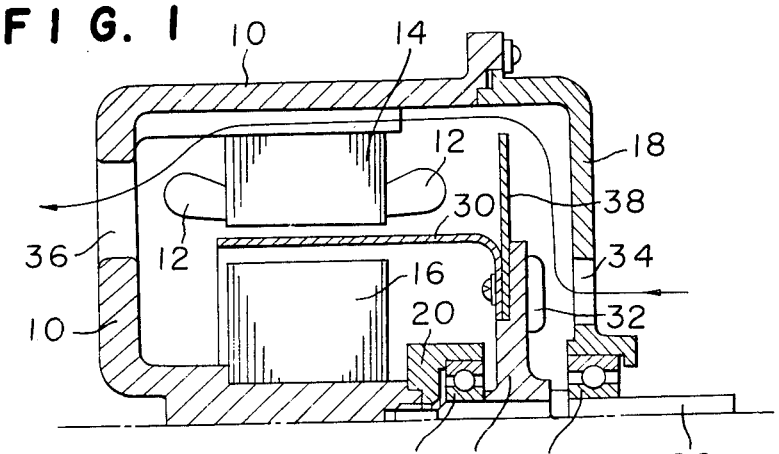
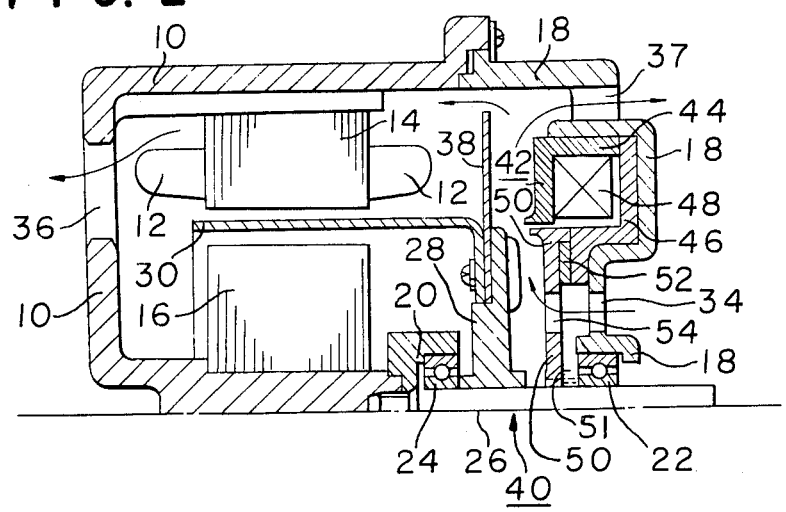
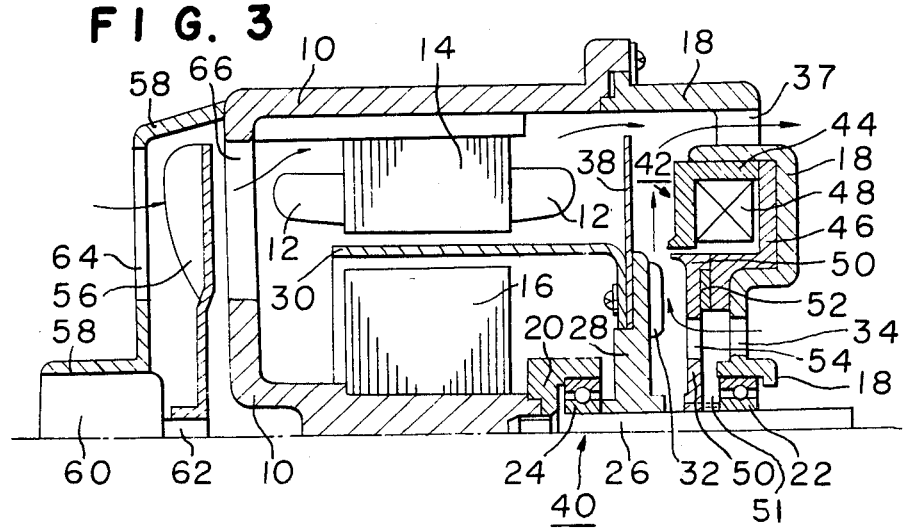

LOW INERTIAL VARIABLE SPEED INDUCTION MOTOR

BACKGROUND OF THE INVENTION

1. Field of the Invention

The present invention relates to a low inertial variable speed induction motor. More particularly, it relates to a low inertial variable speed induction motor imparting a relatively low revolving energy to a torque.

2. Description of the Prior Art

Usually, steep rising and falling characteristics of a rotating speed have been required for a servomotor for numerical control or a variable speed motor for an industrial sewing machine. For example, the steep rising to a predetermining sewing speed is required at the starting sewing operation of an industrial sewing machine and the steep falling to a predetermined stopping speed is required at the stopping operation.

It has been considered that a DC motor driven by Thyristor-Leonard control electric power is suitable as the motor used for this purpose, because the DC motor has excellent controllability, a large starting torque and excellent speed response. However, a permanent magnet, a commutator, and brush holders are needed for the DC motor. Moreover, it is difficult to impart high revolving speed in view of the rectifying characteristic. The compact and light weight functions are limited and maintenance in the wearing of brushes is required.

On the contrary, an induction motor can be used without special maintenance. If an economical inverter-controlled power source is obtained, the DC motors may be substantially replaced by the induction motors. However, in the conventional variable speed induction motor, a rotor is fixed to a yoke for forming a revolving field by the mutual functions of the stator and the yoke. A driving body is formed by the large heavy parts of the yoke and the rotor. Moreover, the motor has no means for braking the driving body. Therefore, the conventional variable speed induction motor has high revolving energy to the torque of the driving body, and the rotation of the driving body can not be forcibly braked. Therefore, it can not be used as a motor having steep rising or falling response. In order to use the conventional induction motor for the aforementioned purpose, it is disadvantageously necessary to drive the load through a special device such as an electromagnetic junction in a sewing machine, etc.

SUMMARY OF THE INVENTION

It is an object of the present invention to overcome the disadvantages of the conventional motor and to provide a low inertial variable speed induction motor having exceptionally steep rising and falling response in a simple structure wherein a relatively low revolving energy to a torque of a driving body can be set.

It is another object of the present invention to provide a low inertial variable speed induction motor having a reduced dimension in the axial direction.

It is still another object of the present invention to provide a low inertial variable speed induction motor wherein a driving body can be forcibly braked.

The foregoing and other objects of the present invention have been attained by providing a low inertial variable speed induction motor which comprises a stator fixed on a one inside peripheral wall in a frame; a yoke fixed on another inside peripheral wall in the frame to face the stator with a small gap; and a cup type rotor fixed on an output shaft under the condition rotatably inserting the cup part into the gap.

In one embodiment, the stator is fixed on the inside outer peripheral wall in the frame whereas the yoke is fixed on the inside inner peripheral wall in the frame. In a second embodiment, the stator is fixed on the inside inner peripheral wall in the frame whereas the yoke is fixed on the inside outer peripheral wall in the frame.

In a third embodiment, an electromagnetic brake for braking a rotation of the output shaft can be equipped with the output shaft. In a fourth embodiment, a fan for forcibly cooling the inside of the motor is equipped with the motor.

BRIEF DESCRIPTION OF THE DRAWINGS

FIG. 1 is a sectional view of a half portion in respect with the center line of the first embodiment of the low inertial variable speed induction motor of the present invention;

FIG. 2 is a sectional view similar to the FIG. 1 of the second embodiment of the present invention;

FIG. 3 is a sectional view similar to the FIG. 1 of the third embodiment of the present invention;

In the figures, the same reference numerals designate the same or corresponding parts.

DETAILED DESCRIPTION OF THE PREFERRED EMBODIMENTS

Figure 4:
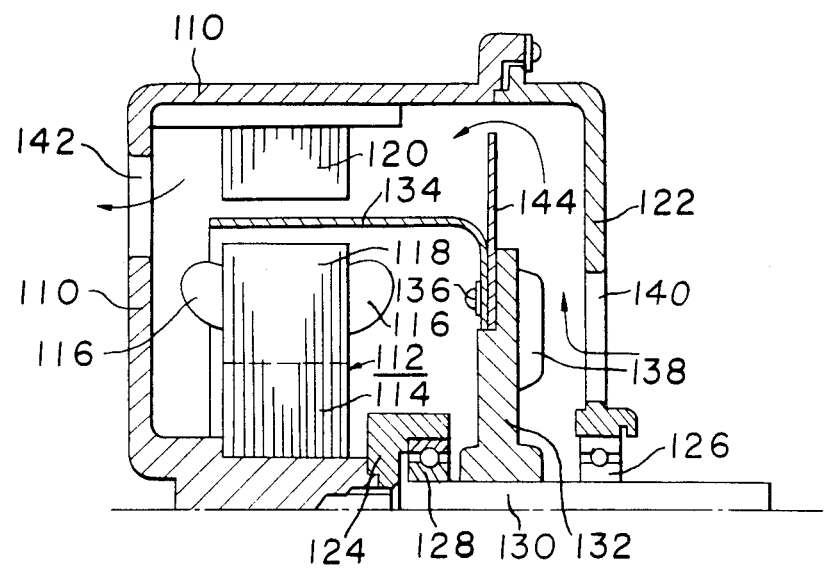
FIG. 4 is a sectional view similar to the FIG. 1 of the fourth embodiment of the present invention.

Certain embodiments of the present invention will be illustrated.

FIG. 1 shows the first embodiment of a low inertial variable speed induction motor of the present invention.

In FIG. 1, a stator (14) having a stator coil (12) used in a conventional induction motor is fixed on an inside outer peripheral wall in a frame (10) of the motor. On the other hand, a yoke (16) of a laminated iron core is fixed on an inside inner peripheral wall in the frame (10), with a small gap to the stator (14). When a current is fed to the stator coil (12), the corresponding revolving field is formed in the gap by the stator (14) and the yoke (16). An output shaft (26) is rotatably supported by bearings (22), (24) which are respectively fixed to a nonmagnetic bracket (18) fixed on the frame (10) and a bushing (20) fixed on the frame (10). A cup type rotor (30) is screwed on a support (28) fixed on the output shaft (26) so as to insert the rotor into the gap. The cup type rotor (30) is a disc made of non-magnetic electric conductor such as aluminum, copper, or a silver-copper alloy. An eddy current is generated in cup type rotor (30) by the rotating magnetic field caused by the stator (14) and the yoke (16) and the driving torque is given by crossing the revolving field and the eddy current.

Cooling fan (32) is formed on the support (28) for cooling the inside of the motor and cooling air is sucked by the fan (32) from a suction hole (34) formed on bracket (18) and hot air is discharged from outlets (36) formed in the frame (10). Disk type heat radiation fins (38) are fixed on the support (28) whereby heat generated in the cup type rotor (30) is eliminated through the heat radiation fins (38).

The feature of the present invention is to have the stator (14) fixed on the inside outer peripheral wall in the frame (10); the yoke (16) fixed on the inside inner peripheral wall in the frame (10) to face the stator (14) with a small gap; and the cup type rotor (30) which is rotatably inserted in the gap and is fixed on the output shaft (26).

The operation of the first embodiment will be illustrated.

The revolving field is formed in the gap by the mutual functions of the stator (14) and the yoke (16) by exciting the stator coil (12), thereby forming an eddy current in the cup type rotor (30) inserted into the gap. The driving torque is given to the cup type rotor (30) by crossing the eddy current to the magnetic flux. The mechanical output can be obtained through the output shaft (26) as the shaft of the cup type rotor (30). The driving body of the motor of the embodiment is a compact, light, low inertial driving body comprising the support (28) fixed on the output shaft (26) and the cup type rotor (30) fixed on the support (28). Therefore, is has excellent response as steep rising or falling at the starting of the motor.

In a conventional induction motor, a rotor and a yoke are fixed in one body to form a driving body. However, in the present invention, the cup type rotor (30) is separated from the yoke (16) and the driving body is formed by the compact light parts of the cup type rotor (30) and the support (28) for supporting the rotor. The cup type rotor (30) is extended in the axial direction and accordingly, the size of the motor can be radially reduced and the surface for forming the eddy current can be increased. Therefore, the motor is suitable for the servo-motor for numerical control or a variable speed motor for an industrial sewing machine for which the steep rising and falling characteristics are required. The steep starting and stopping can be easily performed.

The motor itself is heated by the driving of the motor. The cooling air is sucked through the suction hole (34) and the hot air is discharged through the outlet hole (36) by the rotation of the cooling fan (32) fixed on the support (28). The temperature rising in the motor can be effectively prevented.

The heat radiation fins (38) are mounted in the cup type rotor (30) and the heat of the cup type rotor (30) under the heated condition is transmitted to the heat radiation fins (38). The heat radiation fins (38) are cooled by the cooling air to cool the cup type rotor (30) and the support (28) for supporting the rotor.

FIG. 2 shows the second embodiment of the present invention, which is substantially the same as the first embodiment except that it has an electromagnetic breaking means. A discussion concerning the structure of the motor body is accordingly omitted.

An electromagnetic brake (42) is equipped with the output shaft (26) so as to brake the rotation of the driving body (40) comprising the support (28) and the cup type rotor (30). The electromagnetic brake (42) has the following structure.

The iron cores (44), (46) of the electromagnetic brake (42) are supported on the non-magnetic bracket (18). A brake coil (48) for feeding the magnetic flux to the iron cores (44), (46) of the electromagnetic brake (42) is held on an inner wall of the iron core (44). A brake disc (50) is axially slidably fitted on the output shaft (26). The brake disc (50) is always pushed to the left direction in FIG. 2 by a spring 51 so as to separate from the iron core (46). A brake pad (52) is mounted on the surface of the brake disc (50) to face the iron core (46). A rapid stopping operation of the output shaft (26) is attained by friction of the brake pad (52) and the iron core part (46). The brake disc (50) has throughholes (54) for feeding the cooling air sucked through the suction hole (34) into the motor.

The braking of the driving body (40) is performed by controlling the current passing through the stator coil (12) and the braking coil (46).

For example, when the load connecting to the output shaft (26) in the sewing machine etc. is rapidly stopped, the current passing through the stator coil (12) is interrupted and the current is fed to the brake coil (48) of the electromagnetic brake (42) to actuate the electromagnetic brake (42). The magnetic flux passing through the iron cores (44), (46) and the brake disc (50) is formed by feeding the current through the brake coil (48) whereby the brake disc (50) is attracted to the iron core (46), overcoming the bias of the spring 51, and the rotation of the output shaft (26) is rapidly stopped by the friction between the brake pad (52) and the iron core (46).

When the current is fed to the brake coil (48), the magnetic flux is formed in the iron cores (44), (46) and the brake disc (50). The bracket (18) supporting the iron cores (44), (46) is made of a non-magnetic material whereby magnetic flux is not leaked from the iron core (46) through the bracket (18) and the bearing (22) to the brake disc (50).

The leaked magnetic flux is not passed through the bearing (22) under the rotating condition, thereby preventing heat damage of the bearing caused by the eddy current resulting from leaked magnetic flux.

FIG. 3 shows the third embodiment of a low inertial variable speed induction motor of the present invention. The same references designates the identical or corresponding parts in the former embodiments.

The important feature of the embodiment shown in FIG. 3 is to have the stator (14) fixed on the inside outer peripheral wall in the frame (10); the yoke (16) fixed on the inside inner peripheral wall in the frame (10) to face the stator (14) with a small gap; the cup type rotor (30) fixed on the output shaft (26) under a condition of rotation in the gap; and the electromagnetic brake (42) for braking the rotation, connected to the output shaft (26) and a fan (56) equipped with a motor to forcibly cool inside of the motor.

In order to cool inside of the motor heated by the rotation of the motor, a motor (60) for cooling is supported on the support (58) mounted on the frame (10) and the fan (56) for forcibly cooling is fixed on the shaft (62) of the motor (60). A forcible inlet hole (64) and a forcible ventilation hole (66) are respectively formed in the support (58) and the frame (10). The cooling operation of the fan (56) is performed by the driving of the motor (60).

In the third embodiment, the fan (56) for forcibly cooling is placed outside of the frame (10). It is possible to place the fan (56) for forcibly cooling inside of the frame (10) and to drive the fan (56) by the output shaft (26).

In accordance with the third embodiment of the present invention, the fan (56) for forcibly cooling is driven by the motor (60) for cooling whereby the cooling air is forcibly fed from the external part into the motor. The heated parts such as the cup type rotor (30) and the heat radiation fins (38) in the motor are cooled by the cooling air. The hot air is discharged through the outlet (37) by the fan (56) for forcibly cooling. Thus, the effective cooling is performed.

Figure 5:
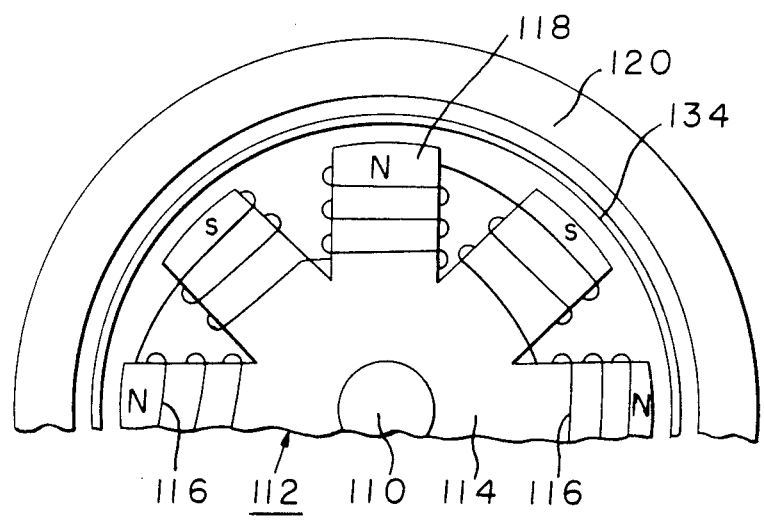
FIG. 5 is a plan view, partially removed, of a stator and a yoke of the fourth embodiment shown in FIG. 4.

FIG. 4 shows the fourth embodiment of a low inertial variable speed induction motor of the present invention wherein a stator (112) is fixed on the inside inner peripheral wall of the frame (110) of a motor. The stator (112) comprises an iron core (114) and a stator coil (116) wound on the iron core (114). The iron core (114) is provided with circularly positioned magnetic poles (118) which have opposite polarity in alternate order, as shown in FIG. 5.

On the other hand, a yoke (120) of a laminated iron core is fixed on an inside inner peripheral wall in the frame (110), with a small gap to the stator (112). When a current is fed to the stator coil (116), the corresponding revolving field is formed in the gap by the stator (112) and the yoke (120). An output shaft (130) is rotatably supported by bearings (126), (128) which are respectively fixed to a non-magnetic bracket (122) fixed on the frame (110) and a bushing (124) fixed on the frame (110). A cup type rotor (134) is secured with screws (136) on a support (132) fixed on the output shaft (130) so as to insert the rotor into the gap. The cup type rotor (134) is a disc made of non-magnetic electric conductor such as aluminum, copper, or a silver-copper alloy. An eddy current is generated in cup type rotor (134) by the rotating magnetic field caused by the stator (112) and the yoke (120) and the driving torque is given by crossing the revolving field and the eddy current.

Cooling fan (138) is formed on the support (132) for cooling the inside of the motor and cooling air is sucked by the fan (138) from a suction hole (140) formed on bracket (122) and hot air is discharged from an outlet (142) formed in the frame (110). Disc type heat radiation fins (144) are fixed on the support (132) whereby heat generated in the cup type rotor (134) is eliminated through the heat radiation fins (144).

The feature of the fourth embodiment of the present invention is to have the stator (112) fixed on the inside inner peripheral wall in the frame (110); the yoke fixed on the inside outer peripheral wall in the frame (110) to face the stator (112) with a small gap; and the cup type rotor (134) which is rotatably inserted in the gap and is fixed on the output shaft (130). The operation of the fourth embodiment will be illustrated.

The revolving field is formed in the gap by the mutual functions of the stator and the yoke (120) by exciting the stator coil (116), thereby forming the eddy current in the cup type rotor (134) inserted into the gap. The eddy current loss generated in the stator (112) and the yoke (120) can be reduced because both the stator and yoke are formed by laminated steel sheets.

The driving torque is given to the cup type rotor (134) by crossing the eddy current to the magnetic flux. The mechanical output can be obtained through the output shaft (130) as the shaft of the cup type rotor (134).

Normally, driving torque of the cup type rotor (134) depends upon the diameter and force acting in the tangential direction. A high driving torque can be obtained by increasing the diameter. In the fourth embodiment, the stator, having a greater diameter in comparison with the dimension of the yoke (120), is fixed on the inside inner peripheral wall of the frame (110). This structure permits insertion of the cup type rotor having a greater diameter in the gap formed between the stator (112) and the yoke (120), thereby providing a large driving torque of the rotor (134).

The driving body of the motor of the fourth embodiment is a compact light low inertial driving body comprising the support (132) fixed on the output shaft (130) and the cup type rotor (134) fixed on the support (132). Therefore, it has excellent response as steep rising or falling response at the starting of the motor. In a conventional induction motor, a rotor and a yoke are fixed in one body to form a driving body. On the other hand, in the present invention, the cup type rotor (134) is separated from the yoke (120) and the driving body is formed by the compact light parts of the cup type rotor (134) and the support (132) for supporting the rotor. The cup type rotor (134) is extended in the axial direction and accordingly, the size of the motor can be radially reduced and the surface for forming the eddy current can be increased. Therefore, the motor is suitable for a servomotor for numerical control or a variable speed motor for an industrial sewing machine for which the steep rising and falling characteristics are required. The steep starting and stopping can be easily accomplished.

In the present invention, the structure of the motor is simplified and the length of the motor in the axial direction can be reduced because a low inertial driving body is formed by light miniaturized materials, and necessity of providing an electromagnetic coupling means for increasing response as in the conventional variable speed motor is eliminated.

The motor itself is heated by the driving of the motor. The cooling air is sucked through the suction hole (140) and the hot air is discharged through the outlet hole (142) by the rotation of the cooling fan (138) fixed on the support (132). Temperature rises in the motor can be effectively prevented.

The heat radiation fins (144) are mounted in the cup type rotor (134) and the heat of the cup type rotor (134) under the heated condition is transmitted to the heat radiation fins (144). The heat radiation fins (144) are cooled by the cooling air to cool the cup type rotor (134) and the support (132) for supporting the rotor.

Figure 6:
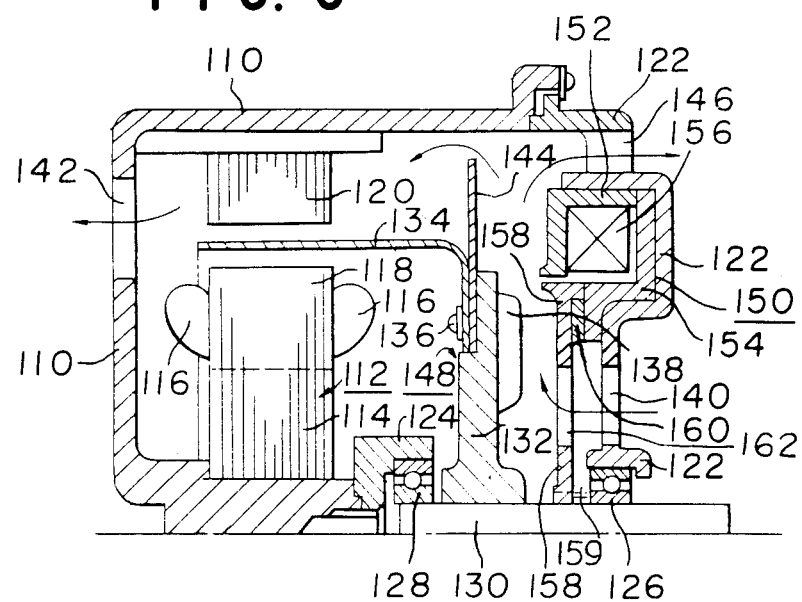
FIG. 6 is a sectional view similar to FIG. 1 of the fifth embodiment of the present invention.

FIG. 6 shows the fifth embodiment as a modification of the embodiment as shown in FIG. 5, of a low inertial variable speed induction motor of the present invention. The same references designates the identical or corresponding parts in the former embodiments.

An electromagnetic brake (150) is equipped with the output shaft (130) so as to brake the rotation of the driving body (148) comprising the support (132) and the cup type rotor (134). The electromagnetic brake (150) has the following structure.

The iron cores (152), (154) of the electromagnetic brake (150) are supported on the non-magnetic bracket (122). A brake coil (156) for feeding the magnetic flux to the iron cores (152), (154) of the electromagnetic brake (150) is held on an inner wall of the iron core (152). A brake disc (158) is axially slidably fitted on the output shaft (130). The brake disc (158) is always pushed to the left direction in FIG. 6 by a spring 159 so as to separate from the iron core (154). A brake pad (160) is mounted on the surface of the brake disc (158) to face the iron core (154). A rapid stopping operation of the output shaft (130) is attained by friction of the brake pad (160) and the iron core part (154). The brake disc (158) has throughholes (162) for feeding the cooling air sucked through the suction hole (140) into the motor.

The braking of the driving body (148) is performed by controlling the current passing through the stator coil (116) and the braking coil (156).

For example, when the load connecting to the output shaft (130) in the sewing machine, etc. is rapidly stopped, the current passing through the stator coil (116) is interrupted and the current is fed to the brake coil (156) of the electromagnetic brake (150) to actuate the electromagnetic brake (150). The magnetic flux passing through the iron cores (152), (154) and the brake disc (158) is formed by feeding the current through the brake coil (156), whereby the brake disc (158) is attracted to the iron core (154), overcoming the bias of the spring 159, and the rotation of the output shaft (130) is rapidly stopped by the friction between the brake pad (160) and the iron core (154).

When the current is fed to the brake coil (156), the magnetic flux is formed in the iron cores (152), (154) and the brake disc (158). The bracket (122) supporting the iron cores (152), (154) is made of a non-magnetic material, whereby magnetic flux is not leaked from the iron core (126) through the bracket (122) and the bearing (126) to the brake disc (158).

The leaked magnetic flux is not passed through the bearing (126) under the rotating condition, thereby preventing heat damage of the bearing caused by the eddy current resulting from the leaked magnetic flux.

Figure 7:
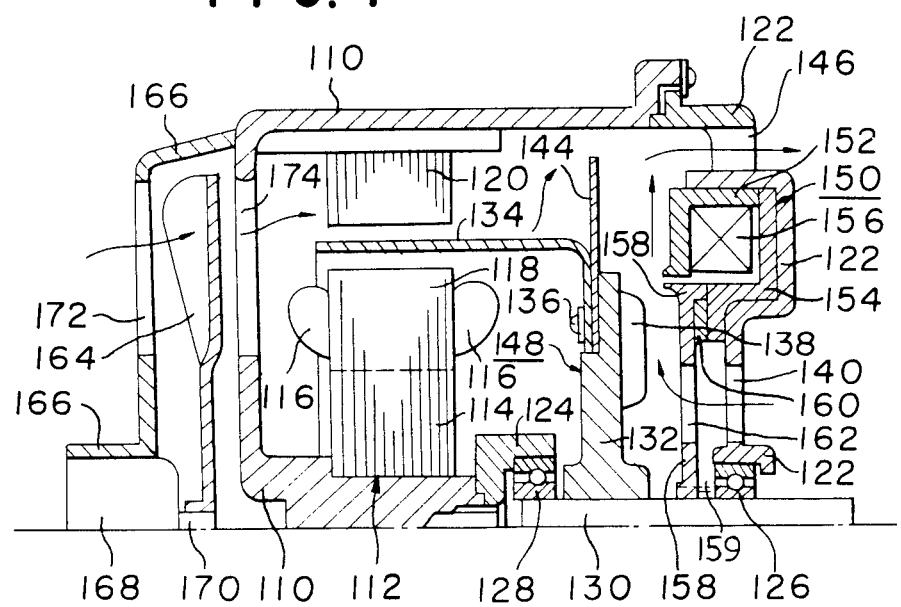
FIG. 7 is a sectional view similar to FIG. 1 of the sixth embodiment of the present invention.

FIG. 7 shows the sixth embodiment of a low inertial variable speed induction motor of the present invention.

The important feature of the embodiment shown in FIG. 7 is to have the stator (112) fixed on the inside outer peripheral wall in the frame (110); the yoke (120) fixed on the inside inner peripheral wall in the frame (110) to face the stator (112) with a small gap; the cup type rotor (134) fixed on the output shaft (130) under the condition rotatably inserting into the gap; and the electromagnetic brake (150) connected to the output shaft (130) for braking the rotation of the output shaft (130) and a fan (164) equipped with a motor to forcibly cool inside of the motor.

In order to cool inside of the motor heated by the rotation of the motor, a motor (168) for cooling is supported on the support (166) mounted on the frame (110) and the fan (164) for forcibly cooling is fixed on the shaft (170) of the motor (168) for cooling. A forcible inlet hole (172) and a forcible ventilation hole (174) are respectively formed in the support (166) and the frame (110). The cooling operation of the fan (164) is performed by the driving of the motor (164).

In the aforementioned embodiment, the fan (164) for forcibly cooling is placed outside of the frame (110). It is possible to place the fan (164) for forcibly cooling inside of the frame (110) and to drive the fan (164) by the output shaft (130).

In accordance with the sixth embodiment of the present invention, the fan (164) for forcibly cooling is driven by the motor (168) for cooling, whereby the cooling air is forcibly fed from the inlet hole (172) through the ventilation hole (174) into the motor. The heated parts such as the cup type rotor (134) and the heat radiation fins (144) in the motor are cooled by the cooling air. The hot air is discharged through the outlet hole (146) by the fan (164) for forcibly cooling. Thus, effective cooling is performed.

In accordance with the present invention, the driving body is formed by the compact, lightweight parts comprising the cup type rotor, which is separated from the yoke and support, for supporting the cup type rotor. The cup type rotor can be axially extended to give a broad surface for forming the eddy current to supply the relatively low revolving energy to the torque of the rotor. Thus, it is possible to provide a low inertial variable speed induction motor having an excellent rising or falling response.

I claim:
1. A low inertial variable speed induction motor comprising:
    (a) a frame;
    (b) a stator fixed on an inside peripheral wall of said frame;
    (c) a yoke fixed on another inside peripheral wall of said frame, said stator and said yoke being sized and positioned to form a small gap therebetween;
    (d) an output shaft which is rotatably mounted in said frame;
    (e) a cup-type rotor fixed on said output shaft and disposed in the gap between said stator and said yoke;
    (f) heat radiation fins operatively connected to said cup-type rotor;
    (g) a fan motor mounted on said frame;
    (h) a first fan operatively connected to said fan motor, said first fan being coaxial with said output shaft and being positioned to blow cooling air over said stator, said yoke, said cup-type rotor, and said heat radiation fins;
    (i) a second fan operatively connected to said cup-type rotor so as to turn therewith, said second fan being positioned to blow cooling air over said heat radiation fins and at least one of said stator and said yoke;
    (j) a non-magnetic bracket fixed on said frame and surrounding said output shaft;
    (k) an iron core mounted on said non-magnetic bracket, thereby being non-rotatable relative to said output shaft;
    (l) a brake coil mounted on said iron core;
    (m) a magnetic brake disc rotatably with but axially slidably on said output shaft adjacent said iron core;
    (n) means for biasing said brake disc away from said iron core; and
    (o) means for switching the current from said stator to said brake coil, thereby drawing said brake disc against said iron core, and thereby rapidly stopping the rotational motion of said output shaft and said cup-type rotor.

2. A low inertial variable speed induction motor as recited in claim 1 wherein said stator is fixed on the inside outer peripheral wall of said frame and said yoke is fixed on the inside inner peripheral wall of said frame.

3. A low inertial variable speed induction motor as recited in claim 1 wherein said stator is fixed on the inside inner peripheral wall of said frame and said yoke is fixed on the inside outer peripheral wall of said frame.

* * * * *